(12) United States Patent
Chen et al.

(10) Patent No.: US 11,024,872 B2
(45) Date of Patent: Jun. 1, 2021

(54) CATHODE MATERIAL HAVING AN ACTIVE COMPONENT AND A SODIUM SALT DISPERSED IN THE ACTIVE COMPONENT, METHOD FOR PREPARING THE SAME, CATHODE AND LITHIUM ION BATTERY

(71) Applicant: NINGDE AMPEREX TECHNOLOGY LIMITED, Ningde (CN)

(72) Inventors: Pengwei Chen, Ningde (CN); Meng Wang, Ningde (CN); Leimin Xu, Ningde (CN); Liang Wang, Ningde (CN)

(73) Assignee: NINGDE AMPEREX TECHNOLOGY LIMITED, Fujian Province (CN)

( * ) Notice: Subject to any disclaimer, the term of this patent is extended or adjusted under 35 U.S.C. 154(b) by 143 days.

(21) Appl. No.: 16/177,074

(22) Filed: Oct. 31, 2018

(65) Prior Publication Data

US 2019/0341649 A1    Nov. 7, 2019

(30) Foreign Application Priority Data

May 7, 2018    (CN) .......................... 201810426425.7

(51) Int. Cl.
*H01M 10/0525* (2010.01)
*H01M 4/131* (2010.01)
(Continued)

(52) U.S. Cl.
CPC ....... *H01M 10/0525* (2013.01); *H01M 4/131* (2013.01); *H01M 4/405* (2013.01); *H01M 2004/027* (2013.01)

(58) Field of Classification Search
CPC .. H01M 10/0525; H01M 4/131; H01M 4/405; H01M 2004/027; H01M 2004/028; H01M 10/4235; H01M 4/525; H01M 4/1391; H01M 4/0471; H01M 4/362; H01M 4/62; H01M 4/505; H01M 4/485
(Continued)

(56) References Cited

U.S. PATENT DOCUMENTS

2016/0204434 A1*  7/2016  Uezono ................. H01M 4/139
                                                                    429/209
2016/0365571 A1   12/2016  Kim et al.
(Continued)

FOREIGN PATENT DOCUMENTS

CN          106133958 A      11/2016
CN          106784669 A       5/2017

OTHER PUBLICATIONS

Huan Yang et al., Uniform Surface Modification of Li 2 ZnTi 3 0 8 by Liquated Na 2 Mo0 4 to Boost Electrochemical Performance, ACS Applied Materials & Interfaces, vol. 9, No. 50, Dec. 5, 2017, pp. 43603-43613.
(Continued)

*Primary Examiner* — Gary D Harris
(74) *Attorney, Agent, or Firm* — Morgan, Lewis & Bockius LLP

(57) ABSTRACT

The present disclosure provides a cathode material, a method for preparing the same, a cathode and lithium ion battery having the same. The cathode material includes an active component; and a sodium salt dispersed in the active component.

14 Claims, 1 Drawing Sheet

(51) Int. Cl.
*H01M 4/40* (2006.01)
*H01M 4/02* (2006.01)

(58) Field of Classification Search
USPC .......................................... 429/322
See application file for complete search history.

(56) References Cited

U.S. PATENT DOCUMENTS

2017/0098848 A1* 4/2017 Sammells ............. H01M 4/502
2018/0351196 A1* 12/2018 Zhamu ................ H01M 4/5835

OTHER PUBLICATIONS

Li Meng et al., "Rhombohedral Li2.4Na0.6V2(P04)3@C nanoplates as high-rate and long-life cathode materials for lithium-ion batteries," Journal of Materials Science, Kluwer Academic Publishers, Dordrecht, vol. 53. No. 14, Apr. 18, 2018, pp. 10327-10337.
Ningde Amperex Technology Limited, Extended European Search Report, EP19172930.0, dated Aug. 21, 2019, 11 pgs.

* cited by examiner

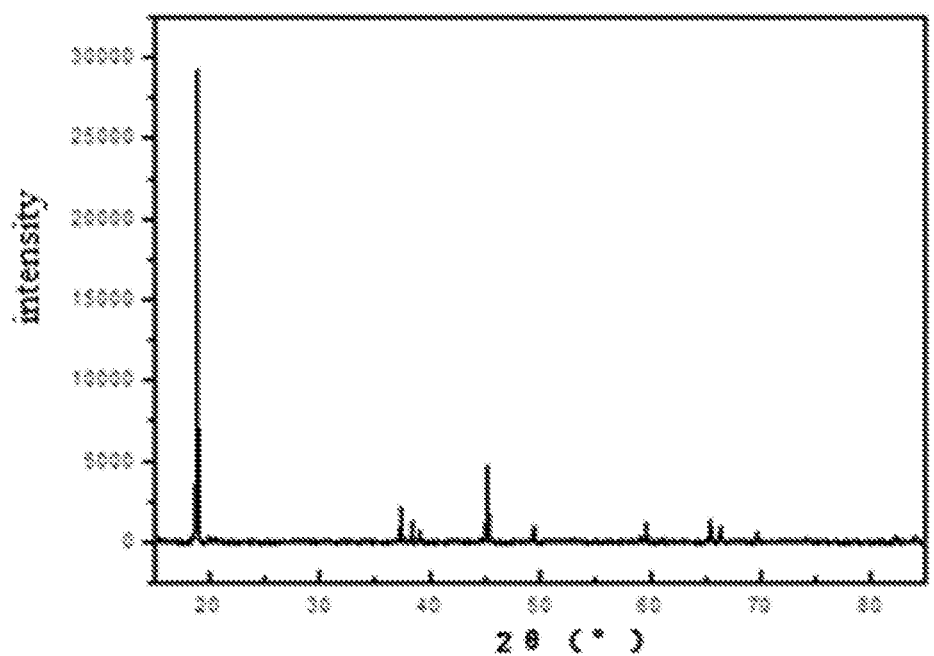

CATHODE MATERIAL HAVING AN ACTIVE COMPONENT AND A SODIUM SALT DISPERSED IN THE ACTIVE COMPONENT, METHOD FOR PREPARING THE SAME, CATHODE AND LITHIUM ION BATTERY

CROSS-REFERENCE TO RELATED APPLICATION

This application claims priority to and benefits of Chinese Patent Application Serial No. 201810426425.7, filed with the State Intellectual Property Office of P. R. China on May 7, 2018, and the entire content of which is incorporated herein by reference.

TECHNICAL FIELD

The present disclosure relates to the field of batteries, and more particularly to a cathode material, a method for preparing the same, a cathode and lithium ion battery having the same.

BACKGROUND

Lithium-ion battery, as a secondary chemical power source, has been widely used in small digital products such as mobile phones and has been widely recognized and favored, because of its advantages of clean, environment-friendly, high-efficiency, security and high energy density. However, the security of the lithium-ion battery still restricts its further applications to a large extent.

Cathode material has a significant influence on the performance of the lithium ion battery as an important part thereof. Therefore, it is particularly important to optimize and improve the cathode material constantly. Lithium cobaltate, one of the most widely used cathode materials in the lithium ion battery, has been fully studied through decades of development with respect to its structural characteristics and electrochemical performance, and its synthetic process and industrial production have been quite mature. Even more, by virtue of its higher discharge voltage plateau and high energy density, lithium cobaltate has always dominated the cathode material of consumer lithium ion battery. However, lithium cobaltate also has some disadvantages, for example, phase transition and structural collapse will occur at a high voltage, resulting in deterioration of rate capability, and a contact reaction with an electrolyte results in surface damage and gas production, thereby affecting the security of the battery and shortening the service life of the battery.

Therefore, the current technology related to the lithium ion battery still needs to be improved.

SUMMARY

Embodiments of the present disclosure seek to solve at least one of the problems existing in the related art to at least some extent. For this, the present disclosure is to provide a cathode material having advantages of good stability, high security, high specific capacity, stable rate capability, low thickness expansion rate at high-temperature storage, and high cycle capacity retention rate, etc.

For this, according to embodiments of a first aspect of the present disclosure, there is provided a cathode material, the cathode material includes an active component; and a sodium salt dispersed in the active component.

In embodiments of the present disclosure, the cathode material includes an active component phase and a sodium salt phase, and the active component phase and the sodium salt phase are bonded via a chemical bond.

In embodiments of the present disclosure, a transition region where at least the active component phase and the sodium salt phase are doped with each other is present at an interface between the active component phase and the sodium salt phase.

In embodiments of the present disclosure, the active component phase includes a hexagonal layered structure, and the sodium salt phase includes a layered structure.

In embodiments of the present disclosure, based on a total mass of the cathode material, a mass percent of the sodium salt is in a range of 0.1% to 10%.

In embodiments of the present disclosure, the sodium salt has a chemical structure of $Na_aM_cO_b$, where $0<a\le3$, $0<b\le7$, $0<c\le3$, and M includes at least one element selected from the group of Mo, Cr, Ti and V.

In embodiments of the present disclosure, the sodium salt includes at least one selected from the group of $Na_2MoO_4$, $Na_2CrO_4$, $Na_2Ti_3O_7$ and $Na_3VO_4$.

In embodiments of the present disclosure, the cathode material has an average particle size of 0.1 to 20 µm.

In embodiments of the present disclosure, the active component includes at least one selected from the group of lithium cobaltate, lithium nickel cobalt manganite composite oxide and lithium nickel cobalt aluminate composite oxide.

According to embodiments of a second aspect of the present disclosure, a method for preparing a cathode material is provided. The method includes: ball-milling a mixture of a sodium salt precursor and an active component to obtain a cathode material precursor; and sintering the cathode material precursor to obtain the cathode material.

In embodiments of the present disclosure, the sodium salt precursor is obtained by ball-milling a mixture of a sodium source, an M source and a complexing agent, in which the sodium source includes at least one selected from the group of $Na_2CO_3$, NaOH, $NaNO_3$, $CH_3COONa$ and $Na_3C_6H_5O_7\cdot2H_2O$, the M includes at least one element selected from the group of Mo, Cr, Ti and V, the M source includes at least one selected from the group of $MoO_3$, $H_8MoN_2O_4$, $Mo(NO_3)_3\cdot5H_2O$, $Cr_2O_3$, $CrCl_3\cdot6H_2O$, $H_8CrN_2O_4$, $TiO_2$, $TiCl_4$, $Ti(NO_3)_4$, $V_2O_5$, $V_2O_3$ and $NH_4VO_3$, and the complexing agent includes at least one selected from the group of polyvinylpyrrolidone (PVP), polyvinyl alcohol (PVA), ethylenediaminetetraacetic acid (EDTA) and glucose ($C_6H_{12}O_6$).

In embodiments of the present disclosure, the sintering is performed in an oxygen or air atmosphere at a temperature of 600 to 1000° C.

According to embodiments of a third aspect of the present disclosure, a cathode is provided. The cathode includes the cathode material as described hereinbefore.

According to embodiments of a fourth aspect of the present disclosure, a lithium ion battery is provided. The lithium ion battery includes the cathode material or the cathode as described hereinbefore.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawing, in which:

FIG. 1 is a XRD diagram of a cathode material according to an embodiment of the present disclosure.

DETAILED DESCRIPTION

In the following, the technical solutions of the present disclosure will be described in detail with reference to examples. It should be appreciated to those skilled in the art that, the examples described below are explanatory, illustrative, and only used to generally understand the present disclosure, and shall not be construed to limit the present disclosure. Examples which do not indicate specific techniques or conditions are carried out in accordance with either the descriptions in literatures in the related art or the product specifications. Reagents or instruments whose manufacturers are not indicated are conventional products, which are commercially available.

The present disclosure is achieved by the present inventors based on the following knowledge and discoveries.

Although lithium cobaltate has a high discharge voltage plateau and high energy density, its thermal stability and electrochemical stability are poor at a high voltage (usually higher than 4.3 V), it is prone to occur phase transition and structural collapse, resulting in deterioration of the rate capability, and a contact reaction with an electrolyte results in surface damage and gas production, thereby affecting the security of a battery and shortening the service life of the battery. In view of the above problems, the inventors have carried out intensive researches and found out that if a sodium salt is added to an active component, a cathode material obtained thereby has a stable particle surface, the addition of the sodium salt can improve structural characteristics of the active component, so that a battery applying such a cathode material can still maintain a good thermal stability and electrochemical stability, achieve a low expansion rate at high-temperature storage and a high cycle capacity retention rate (good cycle performance), keep a good specific capacity, and further improve its security, even at the high voltage.

In embodiments of a first aspect of the present disclosure, there is provided a cathode material, the cathode material includes an active component; and a sodium salt dispersed in the active component. The inventors found that, by dispersing the sodium salt in the active component, structural characteristics of the active component can be improved, synergetic effects of the sodium salt with the active component are exerted, and the particle surface stability and cycle performance of the cathode material are improved, so that a battery applying such a cathode material maintains a good thermal stability and electrochemical stability, achieves a low expansion rate at high-temperature storage to improve the security of the cathode material, and achieve a high cycle capacity retention rate (good cycle performance) to improve the service life of the cathode material, and still keeps a good specific capacity. Moreover, the sodium salt has a better structural stability than that of the active component, and its structural damage degree at the high voltage (usually higher than 4.3 V) is much less than that of the active component, which allows the cathode material to have a better thermal stability and electrochemical stability even at a high voltage working condition, avoiding occurrences of the phase transition and the structural collapse and the deterioration of rate capability, thereby improving the working security and cycle performance of the cathode material.

According to embodiments of the present disclosure, the active component is not specifically restricted, and can be flexibly chose by those skilled in the art according to practical demands. In embodiments of the present disclosure, the active component includes at least one selected from the group of lithium cobaltate, nickel cobalt lithium manganite and lithium nickel cobalt aluminate composite oxide. These active components not only can meet use requirements of the cathode material, but also can better coordinate with the structure of the sodium salt, thereby guaranteeing that the cathode material prepared therefrom has a better cycle performance and electrochemical stability, a low expansion rate at high-temperature storage and a good specific capacity.

In embodiments of the present disclosure, the cathode material includes an active component phase and a sodium salt phase, and the active component phase and the sodium salt phase are bonded via a chemical bond, thereby improving chemical stability, thermal stability, electrochemical stability and structural stability of the cathode material.

In embodiments of the present disclosure, a transition region where at least the active component phase and the sodium salt phase are doped with each other is present at an interface between the active component phase and the sodium salt phase.

It usually occurs at the interface between the active component phase and the sodium salt phase that, metal ions of the active component and the sodium salt enter into crystals of the other one to form an inter-substituted structure, i.e., an inter-doped transition region. In the transition region, at least two kinds of deintercalatable metal ions are involved in charge transfer, such that the inter-substituted structures can effectively stabilize a phase interface of the active component. Furthermore, as the electrochemical stability and the thermal stability of the sodium salt are superior to that of the active component, the addition of the sodium salt can improve the thermal stability and the electrochemical stability of the surface of the active component through physical or chemical bond with the active component phase at the phase interface, and reduce direct contact between the active component and an electrolyte in a battery applying this cathode material so as to further improve the security of the battery. Moreover, several communicated ion channels are formed between these two phases, which will reduce an interfacial resistance in ion migration process, optimize the ion diffusion environment and the cycle performance of the cathode material, and also is beneficial to improvement of the interface stability and the overall conductivity of the material.

In some embodiments of the present disclosure, lithium cobaltate is used as the active component, at least one of Na2MoO4, Na2CrO4, Na2Ti3O7 or Na3VO4 is used as the sodium salt. The addition of the sodium salt makes the cathode material include both the lithium cobaltate phase and the sodium salt phase, and a transition region where at least the lithium cobaltate phase and the sodium salt phase are doped with each other is present at an interface of the lithium cobaltate phase and the sodium salt phase. In the transition region, at least two kinds of deintercalatable metal ions are involved in charge transfer, i.e., at the interface of the two phases, cobalt atoms and other metal atoms (at least one selected from the group of Mo, Cr, Ti and V) enter into crystals of the other phase due to the atomic diffusion to form an inter-substituted structure, which can effectively stabilize the phase interface of lithium cobaltate particles. Moreover, as the electrochemical stability and the thermal stability of the sodium salt are superior to that of the active component, the addition of the sodium salt can improve the thermal stability and the electrochemical stability of the surface of lithium cobaltate through physical or chemical bond with the active component phase at the phase interface, reduce direct contact between lithium cobaltate and an electrolyte so as to further improve the security of the battery. Furthermore, several communicated Li-ion channels are formed between these two phases, which reduces the interfacial resistance in ion migration process, optimizes the diffusion environment of Li ions and finally optimizes the cycle performance of the cathode material.

In embodiments of the present disclosure, in order to make the cathode material have a more stable structure, the active component phase includes a hexagonal layered structure, and the sodium salt phase includes a layered structure. In this way, the cathode material has a better structural stability. Moreover, the stability of the layered sodium salt is superior to that of the hexagonal layered active component, and thus the stability of the active component can be effectively improved.

In embodiments of the present disclosure, the sodium salt has a chemical structure of $Na_aM_cO_b$, where $0<a\leq 3$, $0<b\leq 7$, $0<c\leq 3$, and M includes at least one element selected from the group of Mo, Cr, Ti and V. Therefore, the performances of the active component and the use performances of the cathode material can be improved. In embodiments of the present disclosure, the sodium salt includes at least one selected from the group of $Na_2MoO_4$, $Na_2CrO_4$, $Na_2Ti_3O_7$ and $Na_3VO_4$, each of which has a layered structure and possesses a good structural stability, and thus can effectively improve the stability of the cathode material. As the sodium salts listed above all are intercalatable lithium compounds, and have better structural stabilities than that of lithium cobaltate, and thus can improve the stability of the cathode material better.

In embodiments of the present disclosure, in order not to affect a specific capacity of a battery using the cathode material, a mass percent of the sodium salt is in a range of 0.1% to 10%, based on a total mass of the cathode material. In some embodiments of the present disclosure, the mass percent of the sodium salt is in a range of 1% to 5%. Therefore, as described above, the addition of the sodium salt can effectively improve the thermal stability, electrochemical stability, expansion rate at high-temperature storage and cycle capacity retention rate of the cathode material. The sodium salt in above mass percent not only can keep the hexagonal layered structure of the main body of the cathode material, but also can effectively improve the thermal stability and electrochemical stability of the cathode material while guaranteeing a better specific capacity can be achieved using this cathode material. The performance of the cathode material is improved by fully using synergetic effects of two kinds of sodium salts with the active component, so as to further improve the use performance and service life of the cathode material. Moreover, with the increase of the addition amount of the sodium salt, the thickness expansion rate at high-temperature storage of the battery applying this cathode material will be reduced gradually, and the security of the battery will be improved. As compared with the above mass percent (0.1% to 10%), if the addition amount of the sodium salt is too low, the improvement effect is not significant, and the improvement of the electrical performance of the battery applying this cathode material is not significant either; if the addition amount of the sodium salt is excessive, the cycle performance of the cathode material will be declined, and the specific capacity of the battery applying this cathode material will be reduced either.

In embodiments of the present disclosure, in order to avoid agglomeration of the cathode material, an average particle size of the cathode material is in a range of 0.1 to 20 μm. Therefore, the particle size of the cathode material is consistent with that of the active component commonly used in the battery, that is, the addition of the sodium salt does not change the particle size of the active component, thereby effectively preventing the agglomeration of the active component during the preparation of the cathode material, and avoiding the effect on the performance of cathode material.

According to embodiments of a second aspect of the present disclosure, there is provided a method for preparing the above described cathode material. The method includes the following operations.

A mixture of a sodium salt precursor and an active component is ball-milled to obtain a cathode material precursor.

In embodiments of the present disclosure, the sodium salt precursor is obtained by ball-milling a mixture of a sodium source, an M source and a complexing agent. The sodium source includes at least one selected from the group of $Na_2CO_3$, NaOH, $NaNO_3$, $CH_3COONa$ and $Na_3C_6H_5O_7\cdot 2H_2O$, the M includes at least one element selected from the group of Mo, Cr, Ti and V, the M source includes at least one selected from the group of $MoO_3$, $H_8MoN_2O_4$, $Mo(NO_3)_3\cdot 5H_2O$, $Cr_2O_3$, $CrCl_3\cdot 6H_2O$, $H_8CrN_2O_4$, $TiO_2$, $TiCl_4$, $Ti(NO_3)_4$, $V_2O_5$, $V_2O_3$ and $NH_4VO_3$, and the complexing agent includes at least one selected from the group of polyvinylpyrrolidone (PVP), polyvinyl alcohol (PVA), ethylenediaminetetraacetic acid (EDTA) and glucose ($C_6H_{12}O_6$). These materials are cheap and widely available, and have a wide application range, from which the sodium salt precursors meeting use requirements can be prepared. With these sodium salt precursor, sodium salts, such as $Na_2MoO_4$, $Na_2CrO_4$, $Na_2Ti_3O_7$ or $Na_3VO_4$, which have stable structures and can effectively improve the structural characteristics of the active component can be effectively obtained in the subsequent operations.

In embodiments of the present disclosure, conditions, such as time, for ball-milling the mixture of the sodium source, the M source and the complexing agent and for ball-milling the mixture of the sodium salt precursor and the active component will not be limited herein, which can be flexibly chose by those skilled in the art according to practical demands.

In embodiments of the present disclosure, the cathode material precursor is sintered to obtain the cathode material.

In embodiments of the present disclosure, the sintering is performed in an oxygen or air atmosphere at a temperature of 600 to 1000° C. The sintering can improve crystallinity of the sodium salt, the sodium salt obtained thereby will have a good stability, and thus the use stability and the security of the cathode material can be improved. A Lower sintering temperature (below 600° C.) is not conducive to the formation of the sodium salt, and thus the improvement effect of the cathode material is not significant; while an excessive sintering temperature (higher than 1000° C.) may cause over-sintering of the active component, which will lower the specific capacity and the cycle performance of the battery using the cathode material. However, the sintering temperature in the range of 600 to 1000° C. will give the cathode material a better use performance as compared with other sintering temperatures.

The method as described above has a simple, mature process and is easy to be controlled. Moreover, in the cathode material prepared with the method, the sodium salt is dispersed in the active component, the structural characteristics of the active component can be improved, synergetic effects of the sodium salt with the active component are exerted, and the particle surface stability of the cathode material is improved, so that a battery applying such a cathode material can maintain a good thermal stability and electrochemical stability, achieve a low expansion rate at high-temperature storage and a high cycle capacity retention rate (good cycle performance), keep a good specific capacity, and further improve its security and service life. Moreover, the sodium salt has a better structural stability than that of the active component, and its structural damage degree at the high voltage (usually higher than 4.3 V) is much less than that of the active component, which allows the cathode material to have a better thermal stability and electrochemical stability even at a high voltage working condition, avoiding occurrences of the phase transition and the structural collapse and the deterioration of the rate capability, thereby improving the working security and cycle performance of the cathode material.

According to embodiments of a third aspect of the present disclosure, a cathode is provided. The cathode includes the cathode material as described hereinbefore. Therefore, the cathode has a good thermal stability and electrochemical stability, such that a battery applying such a cathode can still maintain a good thermal stability and electrochemical stability, achieve a low expansion rate at high-temperature storage and a high cycle capacity retention rate (good cycle performance), keep a good specific capacity, and further improve its security and service life, even at the high voltage.

According to embodiments of a fourth aspect of the present disclosure, a lithium ion battery is provided. The lithium ion battery includes the cathode material or the cathode as described hereinbefore. Therefore, the battery can still maintain a good thermal stability and electrochemical stability, achieve a low expansion rate at high-temperature storage and a high cycle capacity retention rate, keep a good specific capacity, and possess a better security and a longer service life, even at the high voltage.

Certainly, it will be appreciated by those skilled in the art that, in addition to the cathode material or the cathode as described hereinbefore, the lithium ion battery has other necessary structures or components of conventional batteries, such as an anode, a separator, an electrolyte, etc. In embodiments of the present disclosure, the anode, the separator and the electrolyte will not be specifically limited, which can be flexibly chose by those skilled in the art according to practical demands. For example, the electrolyte may include one or more selected from the group of ethylene carbonate, propene carbonate, diethyl carbonate, dimethyl carbonate, ethyl methyl carbonate, propylene carbonate, methyl acetate and ethyl propionate. Electrolyte lithium salt includes one or more selected from the group of lithium hexafluorophosphate, lithium perchlorate, lithium hexafluoroarsenate, lithium tetrafluoroborate, trimethyl lithium and lithium chloride. The anode includes materials which can receive or release lithium ions, such as soft carbon, hard carbon, artificial graphite, natural graphite, silicon, silicon oxide, silicon carbide complex, lithium titanate, or metals that can form alloy with lithium. The separator includes but is not limited to PE porous polymeric film.

EXAMPLE

Preparation of Lithium Ion Battery
(1) Preparation of Cathode Material Precursor
The sodium source, the M source (M includes at least one selected from the group of Mo, Cr, Ti and V), and the complexing agent were milled in a tumbling ball mill for a period of time, then synthesized lithium cobaltate was added, proportions of these materials were controlled, the obtained mixture was ball-milled for another period of time, and then taken out of the tumbling ball mill to obtain the cathode material precursor.
(2) Preparation of Cathode Material
The cathode material precursor obtained in (1) was sintered in an oxygen or air atmosphere at a temperature of 600 to 1000° C., and power materials produced thereby were milled to give the cathode material.
(3) Preparation of Cell
The cathode material obtained in (2), acetylene black as a conductive agent, and polyvinylidene fluoride (PVDF) as an adhesive were homogeneously mixed in a weight ratio of 94:3:3 under stirring in N-methyl pyrrolidone solvent system, and then coated onto an aluminum foil, followed by drying and pressing to obtain a cathode sheet.
Artificial graphite as the active component, acetylene black as the conductive agent, butadiene styrene rubber (SBR) as the adhesive, and sodium methyl cellulose (CMC) as a thickener were homogeneously mixed in a weight ratio of 95:2:2:1 under stirring in deionized water solvent system, and then coated onto a copper foil, followed by drying and pressing to obtain an anode sheet.
The PE porous polymeric film was used as the separator.
The cathode sheet, the separator and the anode sheet were stacked in that order and wound to obtain a cell where the separator is arranged between the cathode sheet and the anode sheet to play an isolation effect. Afterwards, the cell was placed in an outer package, to which a ready formulated base electrolyte was injected, and then the outer package was packaged to obtain a lithium ion battery.

Comparative Example 1

Lithium cobaltate was directly sintered in air at 850° C., without compounding with the sodium salt.

Comparative Example 2

Na2CO3 and Mo2O3 were milled in the tumbling ball mill for a period of time, and then lithium cobaltate was added. A proportion of Na2MoO4 in the resulting mixture was controlled to be 3%. The mixture was ball-milled for another period of time, and then taken out of the tumbling ball mill to obtain the cathode material.

Comparative Example 3

LiNi0.8Co0.1Mn0.1O2 material was directly sintered in air at 850° C., without compounding with the sodium salt.

Comparative Example 4

LiNi0.8Co0.15Al0.05O2 material was directly sintered in air at 850° C., without compounding with the sodium salt.

Example 1

Na2CO3 and Cr2O3 were milled in the tumbling ball mill for a period of time, and then lithium cobaltate was added. A proportion of Na2CrO4 in the resulting mixture was controlled to be 0.1%. The mixture was ball-milled for another period of time, and then taken out of the tumbling ball mill to obtain the cathode material precursor. The cathode material precursor was sintered in air at 850° C., and then milled to obtain the cathode material.

Example 2

The cathode material was prepared in accordance with the same method as Example 1, except that the proportion of $Na_2CrO_4$ in the mixture was controlled to be 1%.

Example 3

The cathode material was prepared in accordance with the same method as Example 1, except that the proportion of $Na_2CrO_4$ in the mixture was controlled to be 2%. The cathode material prepared thereby was tested by XRD. The test result is shown in FIG. 1.

Example 4

The cathode material was prepared in accordance with the same method as Example 1, except that the proportion of $Na_2CrO_4$ in the mixture was controlled to be 3%.

Example 5

The cathode material was prepared in accordance with the same method as Example 1, except that the proportion of $Na_2CrO_4$ in the mixture was controlled to be 4%.

Example 6

The cathode material was prepared in accordance with the same method as Example 1, except that the proportion of $Na_2CrO_4$ in the mixture was controlled to be 5%.

Example 7

The cathode material was prepared in accordance with the same method as Example 1, except that the proportion of $Na_2CrO_4$ in the mixture was controlled to be 6%.

Example 8

The cathode material was prepared in accordance with the same method as Example 1, except that the proportion of $Na_2CrO_4$ in the mixture was controlled to be 7%.

Example 9

The cathode material was prepared in accordance with the same method as Example 1, except that the proportion of $Na_2CrO_4$ in the mixture was controlled to be 8%.

Example 10

The cathode material was prepared in accordance with the same method as Example 1, except that the proportion of $Na_2CrO_4$ in the mixture was controlled to be 9%.

Example 11

The cathode material was prepared in accordance with the same method as Example 1, except that the proportion of $Na_2CrO_4$ in the mixture was controlled to be 10%.

Example 12

$Na_2CO_3$ and $MoO_3$ were milled in the tumbling ball mill for a period of time, and then lithium cobaltate was added. A proportion of $Na_2MoO_4$ in the resulting mixture was controlled to be 3%. The mixture was ball-milled for another period of time, and then taken out of the tumbling ball mill to obtain the cathode material precursor. The cathode material precursor was sintered in air at 600° C., and then milled to obtain the cathode material.

Example 13

The cathode material was prepared in accordance with the same method as Example 12, except that the sintering temperature was 650° C.

Example 14

The cathode material was prepared in accordance with the same method as Example 12, except that the sintering temperature was 700° C.

Example 15

The cathode material was prepared in accordance with the same method as Example 12, except that the sintering temperature was 750° C.

Example 16

The cathode material was prepared in accordance with the same method as Example 12, except that the sintering temperature was 800° C.

Example 17

The cathode material was prepared in accordance with the same method as Example 12, except that the sintering temperature was 850° C.

Example 18

The cathode material was prepared in accordance with the same method as Example 12, except that the sintering temperature was 900° C.

Example 19

The cathode material was prepared in accordance with the same method as Example 12, except that the sintering temperature was 950° C.

Example 20

The cathode material was prepared in accordance with the same method as Example 12, except that the sintering temperature was 1000° C.

Example 21

The cathode material was prepared in accordance with the same method as Example 12, except that a proportion of $Na_2Ti_3O_7$ in the mixture was controlled to be 3%, and the sintering temperature was 600° C.

Example 22

The cathode material was prepared in accordance with the same method as Example 12, except that the proportion of $Na_2Ti_3O_7$ in the mixture was controlled to be 3%, and the sintering temperature was 850° C.

Example 23

The cathode material was prepared in accordance with the same method as Example 12, except that the proportion of Na2Ti3O7 in the mixture was controlled to be 3%, and the sintering temperature was 1000° C.

Example 24

The cathode material was prepared in accordance with the same method as Example 12, except that a proportion of Na3VO4 in the mixture was controlled to be 3%, and the sintering temperature was 850° C.

Example 25

Na2CO3 and Cr2O3 were milled in the tumbling ball mill for a period of time, and then LiNi0.8Co0.1Mn0.1O2 material was added. A proportion of Na2CrO4 in the resulting mixture was controlled to be 3%. The mixture was ball-milled for another period of time, and then taken out of the tumbling ball mill to obtain the cathode material precursor. The cathode material precursor was sintered in air at 600° C., and then milled to obtain the cathode material.

Example 26

The cathode material was prepared in accordance with the same method as Example 23, except that the proportion of Na2CrO4 in the mixture was controlled to be 3%, and the sintering temperature was 850° C.

Example 27

The cathode material was prepared in accordance with the same method as Example 23, except that the proportion of Na2CrO4 in the mixture was controlled to be 3%, and the sintering temperature was 1000° C.

Example 28

The cathode material was prepared in accordance with the same method as Example 23, except that the proportion of Na2CrO4 in the mixture was controlled to be 0.1%, and the sintering temperature was 850° C.

Example 29

The cathode material was prepared in accordance with the same method as Example 23, except that the proportion of Na2CrO4 in the mixture was controlled to be 10%, and the sintering temperature was 850° C.

Example 30

Na2CO3 and MoO3 were milled in the tumbling ball mill for a period of time, and then LiNi0.8Co0.15Al0.05O2 material was added. A proportion of Na2MoO4 in the resulting mixture was controlled to be 0.1%. The mixture was ball-milled for another period of time, and then taken out of the tumbling ball mill to obtain the cathode material precursor. The cathode material precursor was sintered in air at 850° C., and then milled to obtain the cathode material.

Example 31

The cathode material was prepared in accordance with the same method as Example 28, except that the proportion of Na2MoO4 in the mixture was controlled to be 3%, and the sintering temperature was 850° C.

Example 32

The cathode material was prepared in accordance with the same method as Example 28, except that the proportion of Na2MoO4 in the mixture was controlled to be 10%, and the sintering temperature was 850° C.

Specific capacity test: at room temperature, the battery was charged at a constant current of 0.2 C (C-rate) to a voltage of 4.45 V and further charged at a constant voltage of 4.45 V until a current below 0.05 C, to make the battery reach a full charge state of 4.45 V, and then discharged at a constant current of 0.2 C until the voltage dropped to 3.0 V. Five batteries were tested for each of comparative examples and examples. Specific capacity data are shown in Table 1.

High temperature storage test: at room temperature, the battery was charged at a constant current of 0.5 C to a voltage higher than 4.45 V, and further charged at a constant voltage of 4.45 V until a current below 0.05 C, to make the battery reach a full charge state of 4.45 V. Before the storage test, a thickness of the full charged battery was tested and recorded as D0, then the full charged battery was placed in an oven at 85° C., after storing for 24 hours, the battery was taken out of the oven and tested immediately for its thickness which was recorded as D1.

The thickness expansion rate of the battery after the high-temperature storage was calculated in accordance with the following formula:

$$\varepsilon = (D1 - D0)/D0 \times 100\%.$$

For each of comparative examples and examples, five batteries were tested, and their average thickness expansion rate was recorded, as shown in Table 1.

Cycle performance test: the lithium ion battery was charged and discharged repeatedly according to the following procedures: at 25° C., the lithium ion battery was charged at a constant current of 0.7 C (i.e., a current value at which a theoretical capacity is fully discharged within 2 h) and then charged at a constant voltage until reaching an upper limit voltage of 4.45 V, and then discharged at a constant discharging current of 0.5 C to a final voltage of 3 V, and a discharge capacity of the first cycle was recorded. The charging-discharging cycle was repeated for 200 times, and a 200th discharge capacity was recorded. The cycle capacity retention rate=(200th discharge capacity/1st discharge capacity)×100%. For each of comparative examples and examples, five batteries were tested, and their average cycle capacity retention rate was recorded, as shown in Table 1.

TABLE 1

Experimental results of Examples and Comparative examples

| | Sodium salt | Lithium salt | Sodium salt content | Average particle size of composite materials | Sintering temperature | 0.2 C discharge specific capacity mAh/g | Thickness expansion rate at high-temperature storage % | Cycle capacity retention rate % |
|---|---|---|---|---|---|---|---|---|
| Example 1 | $Na_2CrO_4$ | $LiCoO_2$ | 0.1% | 16.9 μm | 850° C. | 172 | 35% | 66% |
| Example 2 | $Na_2CrO_4$ | $LiCoO_2$ | 1% | 15.6 μm | 850° C. | 171 | 24% | 75% |
| Example 3 | $Na_2CrO_4$ | $LiCoO_2$ | 2% | 16.3 μm | 850° C. | 170 | 19% | 79% |
| Example 4 | $Na_2CrO_4$ | $LiCoO_2$ | 3% | 15.9 μm | 850° C. | 169 | 15% | 83% |
| Example 5 | $Na_2CrO_4$ | $LiCoO_2$ | 4% | 15.1 μm | 850° C. | 166 | 13% | 80% |
| Example 6 | $Na_2CrO_4$ | $LiCoO_2$ | 5% | 15.7 μm | 850° C. | 162 | 12% | 77% |
| Example 7 | $Na_2CrO_4$ | $LiCoO_2$ | 6% | 15.2 μm | 850° C. | 161 | 12% | 73% |
| Example 8 | $Na_2CrO_4$ | $LiCoO_2$ | 7% | 16.8 μm | 850° C. | 160 | 11% | 72% |
| Example 9 | $Na_2CrO_4$ | $LiCoO_2$ | 8% | 15.3 μm | 850° C. | 159 | 11% | 70% |
| Example 10 | $Na_2CrO_4$ | $LiCoO_2$ | 9% | 15.6 μm | 850° C. | 158 | 10% | 67% |
| Example 11 | $Na_2CrO_4$ | $LiCoO_2$ | 10% | 14.9 μm | 850° C. | 156 | 9% | 65% |
| Example 12 | $Na_2MoO_4$ | $LiCoO_2$ | 3% | 15.6 μm | 600° C. | 163 | 23% | 65% |
| Example 13 | $Na_2MoO_4$ | $LiCoO_2$ | 3% | 16.1 μm | 650° C. | 163 | 23% | 66% |
| Example 14 | $Na_2MoO_4$ | $LiCoO_2$ | 3% | 16.3 μm | 700° C. | 164 | 22% | 68% |
| Example 15 | $Na_2MoO_4$ | $LiCoO_2$ | 3% | 16.2 μm | 750° C. | 164 | 21% | 69% |
| Example 16 | $Na_2MoO_4$ | $LiCoO_2$ | 3% | 16.6 μm | 800° C. | 165 | 20% | 71% |
| Example 17 | $Na_2MoO_4$ | $LiCoO_2$ | 3% | 16.2 μm | 850° C. | 167 | 17% | 77% |
| Example 18 | $Na_2MoO_4$ | $LiCoO_2$ | 3% | 15.9 μm | 900° C. | 164 | 21% | 76% |
| Example 19 | $Na_2MoO_4$ | $LiCoO_2$ | 3% | 16.1 μm | 950° C. | 162 | 25% | 69% |
| Example 20 | $Na_2MoO_4$ | $LiCoO_2$ | 3% | 16.4 μm | 1000° C. | 159 | 30% | 67% |
| Example 21 | $Na_2Ti_3O_7$ | $LiCoO_2$ | 3% | 15.6 μm | 600° C. | 163 | 25% | 69% |
| Example 22 | $Na_2Ti_3O_7$ | $LiCoO_2$ | 3% | 16.4 μm | 850° C. | 164 | 19% | 78% |
| Example 23 | $Na_2Ti_3O_7$ | $LiCoO_2$ | 3% | 16.4 μm | 1000° C. | 159 | 30% | 67% |
| Example 24 | $Na_3VO_4$ | $LiCoO_2$ | 3% | 16.7 μm | 850° C. | 163 | 21% | 76% |
| Example 25 | $Na_2CrO_4$ | $LiNi_{0.8}Co_{0.1}Mn_{0.1}O_2$ | 3% | 15.6 μm | 600° C. | 203 | 18% | 80% |
| Example 26 | $Na_2CrO_4$ | $LiNi_{0.8}Co_{0.1}Mn_{0.1}O_2$ | 3% | 16.1 μm | 850° C. | 208 | 14% | 82% |
| Example 27 | $Na_2CrO_4$ | $LiNi_{0.8}Co_{0.1}Mn_{0.1}O_2$ | 3% | 16.3 μm | 1000° C. | 202 | 19% | 78% |
| Example 28 | $Na_2CrO_4$ | $LiNi_{0.8}Co_{0.1}Mn_{0.1}O_2$ | 0.1% | 16.2 μm | 850° C. | 206 | 25% | 75% |
| Example 29 | $Na_2CrO_4$ | $LiNi_{0.8}Co_{0.1}Mn_{0.1}O_2$ | 10% | 16.6 μm | 850° C. | 196 | 16% | 81% |
| Example 30 | $Na_2MoO_4$ | $LiNi_{0.8}Co_{0.15}Al_{0.05}O_2$ | 0.1% | 17.9 μm | 850° C. | 208 | 16% | 75% |
| Example 31 | $Na_2MoO_4$ | $LiNi_{0.8}Co_{0.15}Al_{0.05}O_2$ | 3% | 17.6 μm | 850° C. | 209 | 9% | 83% |
| Example 32 | $Na_2MoO_4$ | $LiNi_{0.8}Co_{0.15}Al_{0.05}O_2$ | 10% | 17.4 μm | 850° C. | 202 | 8% | 78% |
| Comparative example 1 | \ | $LiCoO_2$ | 0 | 16.5 μm | 850° C. | 172 | 36% | 64% |
| Comparative example 2 | $Na_2MoO_4$ | $LiCoO_2$ | 3% | 15.9 μm | \ | 145 | 36% | 57% |
| Comparative example 3 | \ | $LiNi_{0.8}Co_{0.1}Mn_{0.1}O_2$ | 0 | 17.3 μm | 850° C. | 209 | 29% | 62% |
| Comparative example 4 | \ | $LiNi_{0.8}Co_{0.15}Al_{0.05}O_2$ | 0 | 17.8 μm | 850° C. | 210 | 25% | 69% |

It can be seen from the test results of comparative example 1 and examples 1-11 that, the security and cycle performance of lithium cobaltate are improved in different extents by addition of the sodium salt Na2CrO4, and the Na2CrO4 has a significant effect on the electrical property of the battery. When the mass ratio of Na2CrO4 to the cathode material is in a range of 0.1% to 10%, with the increase of Na2CrO4, the expansion rate of the battery at high-temperature storage is reduced gradually, i.e., the security of the battery is improved; however, when the mass ratio of Na2CrO4 is 0.1%, the improvement of the electrical property of the battery is not prominent as a result of the too little addition; when the addition amount of Na2CrO4 is greater than 10%, the cycle performance and discharge specific capacity of the battery are decreased markedly, the reason may be that a lithium intercalation capacity of Na2CrO4 also with a layered structure is lower than that of lithium cobaltate, and excessive addition of Na2CrO4 leads to the decrease of the discharge specific capacity of the cathode material. Therefore, moderate addition of Na2CrO4 will not only ensure the thermal stability and the electrochemical stability of the material itself being fully exerted, but also will not cause the discharge specific capacity of the cathode material to be lost too much, thereby making better use of synergetic effects of these two materials to improve the performances of the cathode material.

It can be seen from the test results of comparative example 1 and examples 12 to 20 that, the addition of Na2MoO4 has similar effects to that of Na2CrO4. Form a comprehensive view of the expansion rate at high-temperature storage and the cycle capacity retention rate of the battery, the expansion of the cathode material at a high temperature is reduced to a certain extent, and the cycle performance becomes better, which are due to the good stability of Na2MoO4 and the formation of a stable interface between Na2MoO4 and lithium cobaltate. Furthermore, an inter-doped structure is formed as a result of the inter-diffusion of metal atoms in the two phases, which plays a stabilizing effect on the surface of the lithium cobaltate, thereby bringing a great improvement to the stability and security of the cathode material.

From the test results of examples 12 to 20 and comparative example 2, it is demonstrated that, the sintering temperature also is a very important factor affecting the performance of the cathode material. When the sintering temperature is in the range of 600° C. to 1000° C., the expansion rate at high-temperature storage is low, the cycle capacity retention rate is high, and the cathode material still possesses a better capacity. However, when the sintering temperature is lower, the crystallinity of the material is poor, and the performance improvement is not significant; when the sintering temperature is too high, the material will be over-sintered, also leading to the reduction of the specific capacity and the cycle performance of the material.

From the test results of examples 4, 17, 22, 24 and comparative example 1, it is demonstrated that, the addition of Na2MoO4, Na2CrO4, Na2Ti3O7, or Na3VO4 brings improvements to the security of the cathode material in different degrees. Though different materials may have different influences on lithium cobaltate because of their own electrical conductivity and electrochemical activity, the structural stabilities of the layered sodium salts and the synergetic effects with lithium cobaltate also bring active significances to the cathode material.

As can be seen from the experimental results of comparative examples 3, 4 and examples 25 to 32, the technical solutions provided in the present disclosure are not only suitable for lithium cobaltate, but also have similar improvement effects on the active component like lithium nickel cobalt manganite composite oxide (NCM) or lithium nickel cobalt aluminate composite oxide (NCA), thereby effectively improving the security and cycle stability of the cathode material of the battery.

The XRD diagram of the cathode material prepared according to example 3 is shown in FIG. 1, from which it can be seen that the addition of the sodium salt does not destroy the structure of lithium cobaltate, and the main structure in the cathode material is still lithium cobaltate.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A cathode material for a lithium ion battery, comprising:
   an active component; and
   a sodium salt dispersed in the active component;
   wherein the sodium salt has a chemical structure of $Na_aM_cO_b$, where $0<a\leq3$, $0<b\leq7$, $0<c\leq3$, and M comprises at least one element selected from the group of Mo, Cr, Ti and V.

2. The cathode material according to claim 1, wherein the cathode material comprises an active component phase and a sodium salt phase, and the active component phase and the sodium salt phase are bonded via a chemical bond.

3. A cathode material, comprising:
   an active component; and a sodium salt dispersed in the active component, wherein the cathode material comprises an active component phase and a sodium salt phase, and the active component phase and the sodium salt phase are bonded via a chemical bond and a transition region in which at least the active component phase and the sodium salt phase are doped with each other at an interface between the active component phase and the sodium salt phase.

4. The cathode material according to claim 2, wherein the active component phase comprises a hexagonal layered structure, and the sodium salt phase comprises a layered structure.

5. The cathode material according to claim 1, wherein based on a total mass of the cathode material, a mass percent of the sodium salt is in a range of 0.1% to 10%.

6. The cathode material according to claim 5, wherein based on a total mass of the cathode material, the mass percent of the sodium salt is in a range of 1% to 5%.

7. The cathode material according to claim 1, wherein the sodium salt comprises at least one selected from the group of $Na_2MoO_4$, $Na_2CrO_4$, $Na_2Ti_3O_7$ and $Na_3VO_4$.

8. The cathode material according to claim 1, wherein the cathode material has an average particle size of 0.1 to 20 μm.

9. The cathode material according to claim 1, wherein the active component comprises at least one selected from the group of lithium cobaltate, lithium nickel cobalt manganite composite oxide and lithium nickel cobalt aluminate composite oxide.

10. A lithium ion battery, comprising a cell and an electrolyte, wherein the cell comprises a cathode, an anode and a separator, and the cathode comprises a cathode material, wherein the cathode material comprises an active component; and a sodium salt dispersed in the active component, wherein the sodium salt has a chemical structure of $Na_aM_cO_b$, where $0<a\leq3$, $0<b\leq7$, $0<c\leq3$, and M comprises at least one element selected from the group of Mo, Cr, Ti and V.

11. The lithium ion battery according to claim 10, the sodium salt comprises at least one selected from the group of $Na_2MoO_4$, $Na_2CrO_4$, $Na_2Ti_3O_7$ and $Na_3VO_4$.

12. The lithium ion battery according to claim 10, further comprising a cell and an electrolyte, wherein the cell comprises a cathode, an anode and a separator, and the cathode comprises the cathode material.

13. The lithium ion battery according to claim 10, the cathode material comprises an active component phase and a sodium salt phase, and the active component phase and the sodium salt phase are bonded via a chemical bond.

14. The lithium ion battery according to claim 10, wherein based on a total mass of the cathode material, the mass percent of the sodium salt is in a range of 0.1% to 10%.

* * * * *